United States Patent
Junghuber et al.

(10) Patent No.: US 7,523,174 B2
(45) Date of Patent: Apr. 21, 2009

(54) DYNAMIC PORTAL ASSEMBLY

(75) Inventors: Robert Junghuber, Dagersheim (DE); Matthias Kloppmann, Sindelfingen (DE); Frank Leymann, Aidlingen (DE); Markus Reichart, Sindelfingen (DE); Dieter Roller, Schoenaich (DE); Juergen Schaeck, Achem (DE); Thomas Schaeck, Achem (DE)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 10/682,396

(22) Filed: Oct. 9, 2003

(65) Prior Publication Data
US 2004/0133660 A1 Jul. 8, 2004

(30) Foreign Application Priority Data
Oct. 15, 2002 (EP) .................................. 02022899

(51) Int. Cl.
*G06F 15/16* (2006.01)
(52) U.S. Cl. ....................... 709/219; 709/246
(58) Field of Classification Search .................. 709/219
See application file for complete search history.

(56) References Cited

U.S. PATENT DOCUMENTS

| 7,051,036 | B2* | 5/2006 | Rosnow et al. | 707/102 |
|---|---|---|---|---|
| 7,231,394 | B2* | 6/2007 | Walker et al. | 707/101 |
| 2002/0007300 | A1* | 1/2002 | Slatter | 705/9 |
| 2002/0078105 | A1* | 6/2002 | Hamada et al. | 707/530 |
| 2003/0106039 | A1* | 6/2003 | Rosnow et al. | 717/100 |
| 2003/0154232 | A1* | 8/2003 | Beringer et al. | 709/102 |
| 2003/0233372 | A1* | 12/2003 | Warner et al. | 707/104.1 |
| 2005/0192771 | A1* | 9/2005 | Fischer et al. | 702/122 |

* cited by examiner

*Primary Examiner*—Ario Etienne
*Assistant Examiner*—Hee Soo Kim
(74) *Attorney, Agent, or Firm*—Yee & Associates, P.C.; Herman Rodriguez (57) ABSTRACT

A Dynamic Portal Assembly for Portals for manipulating a topology tree of a Portal at runtime. Topology Fragments, that are partial topology trees, are computed by Adapters and are merged with existing trees at run time. The Adapters base the computation on the states of External Systems, e.g., Workflow Systems. An Independent Adapter Interface allows for easy deployment of new Adapters into the Portal. The Dynamic Portal Assembly is adapted to integrate workflow into a Portal without giving awareness to a Portal user.

7 Claims, 8 Drawing Sheets

DYNAMIC PORTAL ASSEMBLY

The present invention relates to a Dynamic Portal Assembly, especially to the dynamic integration of presentation structures from remote systems into the Portal by using the Dynamic Portal Assembly, and in more particularly to dynamically integrate Workflow into Portals by using the Dynamic Portal Assembly.

BACKGROUND OF THE INVENTION

The Portal market is one of the fastest growing markets of computer software. A Portal in the present invention may be defined as an application which provides a secure, single point of interaction with diverse information, business processes, and people, personalized to a user's needs and responsibility. The huge demand drives rapid development of new technologies by different Portal vendors in order to place their products in good market positions. Therefore, it isn't surprising that Portals already ran through different evolutionary phases. In a first step, the Portals were mainly used as access points to different information sources and content was solely chosen by the Portal operator. Soon after that, the users got the possibility to influence the displayed contents and customization was born. This was a great step forward because the user was able to select information according to personal interests and to find relevant information faster. The potential of such user customized information delivery was also interesting in the field of intra business information distribution and the first business or corporate Portals were introduced.

The ongoing evolution also left its footprint in the architecture of Portal products. At first, Portal-like products were delivered as pre-packaged applications that could be installed out of the box and included standard applications, which provided all functionality of the Portal. Step by step, new applications were needed and the vendors extended their products in order to satisfy those requirements. Due to the usage of proprietary designs, the vendors were the only ones, who added new functionality to their Portals and therefore the success of a Portal was closely related to the applications it brought along. This led to the decomposition of the monolithic structures and to the creation of Portal frameworks.

The Portal products offered today employ Portal architectures where a Portal itself only implements standard functionality like security, authorization, authentication, aggregation, caching, user management, enrollment, rendering and so on and provides the infrastructure for application components. This architecture includes APIs for the integration of applications so that applications from different partners can be used as long as they match the Portal product's API. In the Portal environment, these applications are typically called Portlets.

Portlets are pluggable components that can be added to Portals and are designed to run inside a Portal's Portlet container. Portlets may provide different functions ranging from simple rendering of static or dynamic content to application functions such as e-mail, calendar, etc. Portlets are invoked indirectly via the Portal application and produce content that is suited for aggregation in larger pages, e.g. Portlets should produce mark-up fragments adhering guidelines that assure that the content generated by different Portlets can be aggregated into one page. Typically, Portlets run on the Portal-Server, processing input data and rendering content locally. Often, the content for Portlets which are displayed very often is cached locally to improve response times, performance and scalability of Portals. While local Portlets typically provide short response times, this approach is not well suited to enable dynamic integration of business applications and information sources into Portals.

More and more local Portlets running in a Portal environment using Web-Services provided by Web-Service-Provider. Web-Services may be defined as providing existing or software components into a service-oriented architecture (SOA).

In contrast to these major changes, the used customization concepts haven't changed significantly. The biggest difference is that users nowadays choose Portlets from a list provided by the Portal administrator. However, there is no way to integrate whole page structures or page groups into a Portal or to manipulate the set of Portlets a page contains dynamically. But these features would allow for a variety of new Portal applications that would improve the usability of a Portal even more.

One example is remote content integration. Whole page groups or pages could be integrated from remote Portals.

Another example is integration of workflow with Portals. Workflow may be defined in the present invention as an application which provides automation of a business process, in whole or in part, during which documents, information or tasks are passed from one participant to another for action, according to a set of procedural rules. While workflow provides means to pass information and tasks to persons, a Portal provides personalized presentation of this information and the applications required to perform the tasks. The combination of these two technologies promises outstanding synergy.

Existing Workflow Systems use clients that manage lists containing work items, which represent work that have to be performed by the user. The Workflow System determines the users that are capable to perform the work and assigns work items to their lists. In case that there exist Portlets that can process these tasks, these Portlets could be dynamically added or removed to a page and could make the client obsolete to some degree.

It is object of the present invention to provide a Portal mechanism that allows dynamic integration of presentation structures into Portal based on states of Internal or External Systems.

It is further object of the present invention to provide a mechanism that allows dynamic integration of workflow into a Portal.

SUMMARY OF THE INVENTION

The present invention provides a Dynamic Portal Assembly which provides the function to manipulate whole topology tree of a Portal at runtime. Topology Fragments, that are partial topology trees, are computed by software components called Adapters and are merged with existing trees at run time. The Adapters themselves can base the computation on the states of External Systems, e.g. Workflow Systems. The introduction of an Independent Adapter Interface allows for easy deployment of new Adapters into the Portal. In a preferred embodiment of the present invention the Dynamic Portal Assembly is adapted to integrate Workflow into Portal without giving awareness to the Portal user.

Both the foregoing general description and the following detailed description are exemplary and explanatory only and are not intended to restrict the claimed invention. The accompanying drawings, which are incorporated in and constitute a part of this specification, illustrate embodiments of the inventions, together with the description, explain the principles of the invention.

Figure 1:
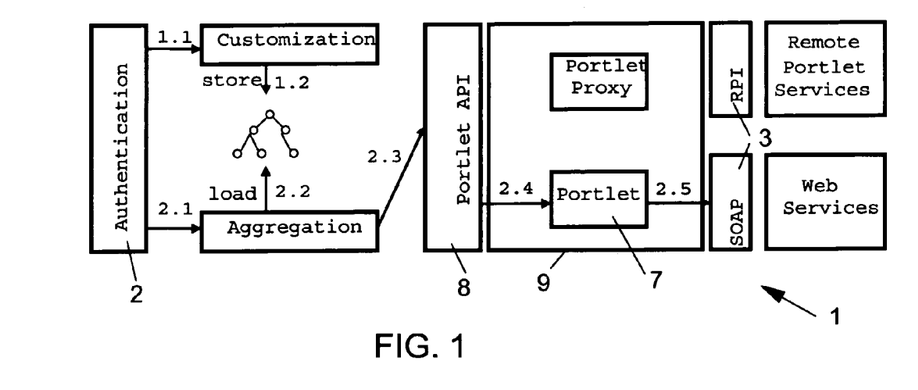
FIG. 1 shows a prior art Portal Model architecture on which the present invention may be based preferably, FIG. 2A/B show a processing of a topology tree as applied by the present invention.

FIG. 1 shows the architecture of the abstract Portal model 1 which serves as the basis for the present invention. As this model uses a local Portlet API 8 and a protocol for invocation of Remote Portlet Web Services 3 (RPI). Each incoming request passes through authentication component 2 in order to determine and to prove the user's identity (2.1). The Portal 1 uses this identity to obtain the data needed for aggregation 2 (2.2). During aggregation, the Portal calls Portlets 7 (2.3) and assembles the returned markup into pages that it returns to the client device. Portlets 7 are executed within a Portlet container 9 and accessed via the Portlet API 8. The Portlets can access additional services using RPI or SOAP 3 (2.5).

Figure 2A:
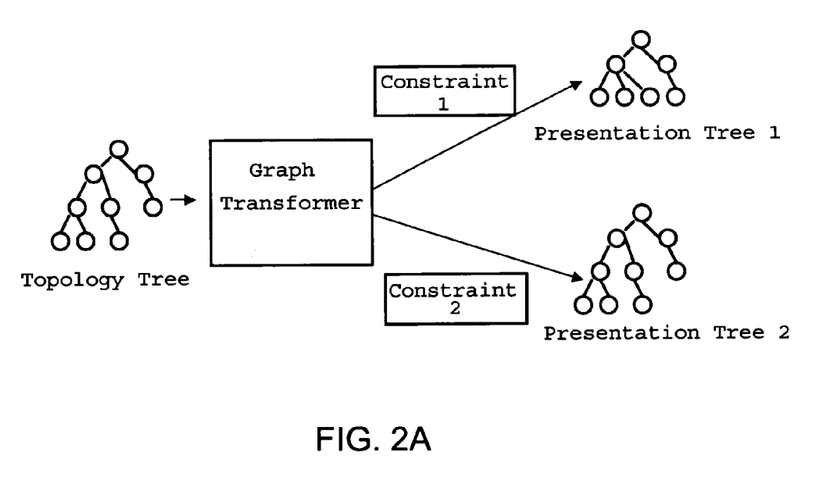
Figure 2B:
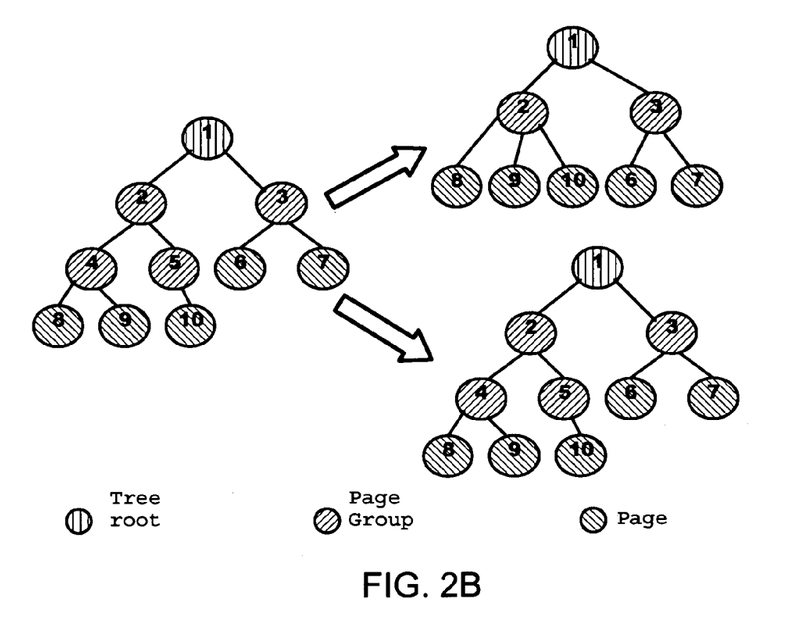

FIG. 2A/B shows a topology tree processing as applied by prior art Portals.

Aggregation includes all steps that are required to assemble a page that is sent back to the client. Typically, these steps are to load a topology tree from storage, to traverse it and to call the instances referenced in the tree in order to obtain their output, which is assembled to a single page. The abstract Portal model additionally introduces the following step. After the topology tree is loaded from storage, it is transformed in accordance to defined constraints into presentation trees (FIG. 2A). These trees are used as input for those modules of the aggregation that act as views and actually create output.

The topology tree may be defined as the relationship as well as the arrangement of the components that are used to create the visual representation of the content. The topology tree will be defined through customisation by the administrators or users and saved in the database.

Most prior art Portals contain a Navigation component which provides the possibility to nest elements and to create a navigation hierarchy, a Container component which allows to group and arrange Portlets, and a Portlet component which contains the Portlet.

Corresponding to these, the abstract Portal model defines components that are used as node types in the topology tree. These components are Page Group, Pages, Container, and Portlet instances. A Page Group is used in order to create a hierarchical navigation structure. Page Groups can themselves contain page groups or pages, but not both types at one time. Pages are the lowest elements in the navigation hierarchy. Pages have containers as children.

Container are used to structure the content of a page. It is possible to nest a number of containers in order to create complex structures. Instances of Portlets may have a user specific customization.

Since the abstract Portal model should provide the possibility to change the look and feel of the Portal, there could be a number of views with different properties. These properties have impact on the data structures the views work on and therefore constraints them. One constraint for example could be that a page group node can't have another page group node as its child. However, the original topology tree maybe doesn't conform to these constraints and therefore it has to be transformed into a conforming one.

Rendering of a topology tree can be divided into rendering navigation elements (page groups and pages), and rendering elements of a page (containers, Portlets).

For maximum flexibility, it should be possible that two different views perform these tasks separately. As a result, there is a need for two different constraints, one for navigation elements of the tree and one for elements in a page.

The Graph Transformer is responsible for the transformation of topology trees into presentation trees, considering constraints that determine the structure of the presentation trees. As graphs are commonly used as data representations, graph transformation forms the basis of many useful computations and therefore the topic has been researched extensively and is theoretically well founded. Graph Rewriting is a term often used in this context.

Graph manipulation can be used implicitly inside a program that creates and modifies a graph or explicitly by using graph rewriting rules that modify a host graph. The rules are applied to a host graph to replace subgraphs by others considering given embedding and condition information. The rules are defined through Graph Rewrite Languages.

A more detailed description of tree transformation and the appropriate algorithms is explained below. FIG. 2B gives an example of such a transformation. Two presentation trees are generated from the original topology tree, based on different constraints. View 1 doesn't allow nesting of page groups. A page group can only contain pages. View 2 does allow unlimited nestings of page groups and therefore the tree can be used without changing it.

The customizer allows users to create new or to manipulate existing topology trees that are saved to the database. The Portlet registry holds information about the available Portlets and the user can choose which one(s) he wants to add to his Portal view and therefore to the topology tree.

Figures 3A, 3B, 3C:
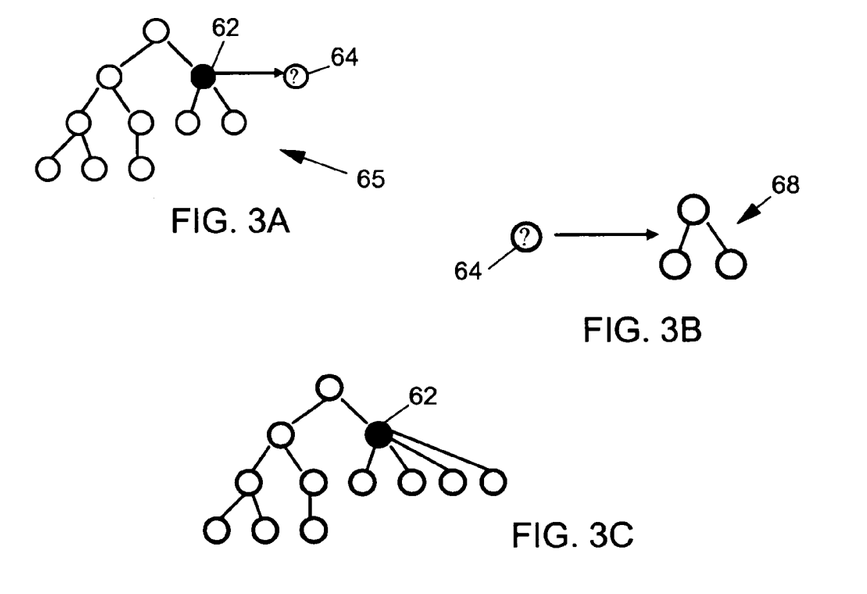
FIG. 3A-C show a processing of a topology tree using the inventive Dynamic Assembly concept.

FIGS. 3A-C show the topology tree processing by using the inventive Dynamic Assembly concept.

In prior art Portals, topology trees remain fix until they are explicitly changed by administrators or users. The inventive Dynamic Portal Assembly overcomes this restriction. Using this inventive concept, it is possible to generate the topology tree dynamically and nodes can appear or disappear between two requests to the Portal.

In order to clearly describe the concept of Dynamic Portal Assembly, the definitions of Topology Fragment, Fragment Placeholder, and Dynamic Node are required. A Topology Fragment is a partial topology tree that is built at runtime, a Fragment Placeholder is a node that is resolved at runtime and replaced through a topology fragment, and Dynamic Node 62 is a node of the topology tree 65 that references a Fragment Placeholder 64. The root node of the replacing topology fragment must be of same type as the Dynamic Node itself.

Dynamic Assembly works as follows: Nodes of a topology tree can be marked as Dynamic Nodes 62 (FIG. 3A). A Dynamic Node 62 references a fragment placeholder 64. At runtime, the fragment placeholder 64 is resolved and the appropriate topology fragment 68 is created (FIG. 3B). Thereafter, the topology fragment 68 is merged with the sub tree of the Dynamic Node yielding the following result (FIG. 3C).

The capability to create topology fragments automatically and to merge them with existing topologies results in the possibility of creating invalid trees. In a Portal model that only allows for explicit definition of topologies through customization, the customizer is the instance that must guarantee the correctness of the Portal topology tree. As it is a part of the system itself, it can be considered as trusted. In contrast, the topology fragments created by third party components have to be validated before they are displayed in order to avoid unforeseen behavior.

Figure 4:
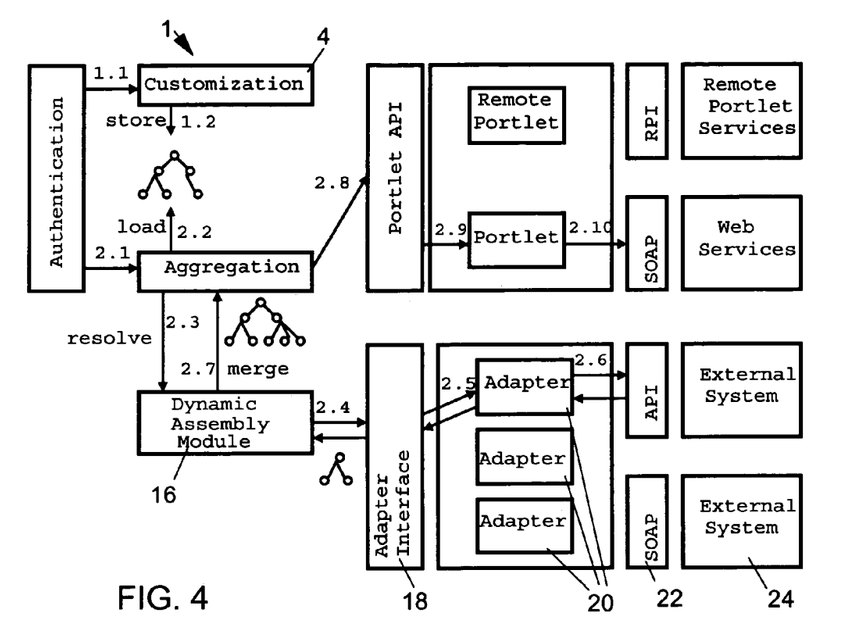
FIG. 4 shows the prior art Portal Model architecture as shown in FIG. 1 extended by the inventive Dynamic Assembly concept.

FIG. 4 shows an abstract prior art Portal Model extended by the inventive Dynamic Assembly concept.

Extended Portal Model

In order to enable the Dynamic Assembly concept, the abstract Portal model needs several extensions including a Dynamic Assembly component that is responsible for resolving the fragment placeholders. FIG. 4 shows the extensions in detail.

The two first steps of the processing of an incoming request are as before. However, the loaded tree contains a Dynamic Node. Therefore, Dynamic Assembly is invoked in order to resolve the Dynamic Node (2.3). Dynamic Assembly in turn calls an Adapter 20 via the Adapter Interface 18 (2.4+2.5), which actually creates the topology fragment. This can be done isolated or depending on the states of External Systems. In the latter case, the Adapter 20 accesses an External System 24 (2.6). This can be either done using APIs or SOAP in cases of remote systems. The returned topology fragment is validated and merged with the existing topology tree (2.7). The inventive Dynamic Assembly concept requires three additional components:

Dynamic Assembly Module 16

The Dynamic Assembly Module 16 is the only component in this part of the architecture that uses Portal dependent classes. It receives requests to resolve fragment placeholders and depending on the fragment placeholder, it obtains a reference to the appropriate Adapter and calls it in order to obtain the topology fragment, it validates the topology fragment, and it merges the topology fragment with the original topology tree.

Adapter Interface 18

All calls from the Dynamic Assembly Module 16 to Adapters 20 are made via the Adapter Interface 18.

As this interface is very important for the interoperability of Adapters it should not contain classes that are specific to a particular Portal implementation. The following information is preferably required by Adapters in order to perform their tasks namely User Information which contains all user relevant data like the user name, the identity, address etc., the Client which contains information about the client device of the user, Locale which determines the locale the client has set.

Knowledge of this value allows the Adapter to provide just one value for language dependent properties instead of values for all languages the Adapter supports.

Fragment Placeholder Info contains all fragment relevant data like IsRemote (determines whether the fragment is remote or not), URL (the URL under which the fragment can be resolved, in case that it is remote), ObjectID (the object id of the page group that a published fragment represents), Markups (the supported markups), Locales (the supported locales), Title (the title of the fragment placeholder), Desc (the description of the fragment placeholder), Parameter (a set of name value pairs that can contain additional properties), and AdapterConfig (the configuration of the Adapter, e.g. properties contained in a deployment descriptor).

The Adapter returns a topology fragment, which is a partial topology tree. As Adapters should be pluggable and reusable in different Portal products, this tree should not contain Portal specific classes. In addition, it should be as general as possible as well as extensible.

Basically, the most important data that is required is the set of Portlets that should be displayed. This information would be enough for a Portal to display them, using a topology that is solely determined by the Portal. However, it should be possible for the Adapter to structure the Portlets on its behalf and therefore additional elements are needed. Theoretically, one additional element would be enough to create a hierarchy and to structure the topology fragment. The Portal would have to determine how it could integrate the structure and therefore it would have to decide how the single nodes are mapped to elements like page groups or pages. As this is a very complex problem, hints are introduced that specify the type of nodes in more detail and allow the Portal to use this information in order to process the tree in a faster and more efficient way. It is distinguished between the type of a node and a hint that determines the type because the Portal does not have to follow the hints in any cases. If it provides the appropriate capabilities it could base computation on the two basic elements.

The returned topology fragment is preferably assembled using the Node which is the base class of nodes in the topology tree (it has references to its parent Node as well as its children), the StructureNode which inherits from Node and is used to create the hierarchical structure of the topology fragment, and the PortletNode which itself represents a Portlet.

Adapter 20

The Adapter 20 creates the topology fragment that replaces the fragment placeholder. In order to perform this task, it can access External Systems through special APIs or use SOAP to access Web Services or other Portals.

To guarantee a maximum of flexibility, the interface between the Dynamic Assembly Module 16 and the Adapter 20 has to be carefully designed. The goal is to create an Adapter that is able to run in different Portal implementations. Therefore, it is very important that the used data structures are independent from any Portal implementation.

FIG. 5A-5G show implementation details of the inventive Dynamic Assembly.

The integration of the Dynamic Assembly concept also requires the modification of the existing components of the Abstract Portal Model. At first, the Customizer component 4 is extended in order to provide the means to add Dynamic Nodes to the topology tree. Therefore, a Fragment Placeholder registry similar to the Portal registry is required that contains information about Fragment Placeholders that can be referenced by Dynamic Nodes. The resulting tree is saved to the database. The next step is to recognize the Dynamic Nodes and to resolve them during aggregation.

As described before the topology tree is loaded form storage and then passed to the Graph Transformer, which performs transformation into a presentation tree that is further used by a view. As the topology tree can now contain Dynamic Nodes that reference fragment placeholders, the question arises when they should be resolved. There are the options the Dynamic Node is resolved before the Graph Transformer processes the topology tree or the Dynamic Node is resolved at the moment it becomes visible to the view component.

Figure 5A:
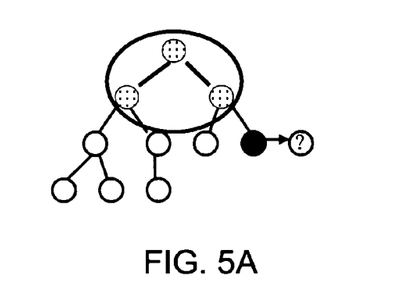
FIG. 5A-G show different embodiments of the Dynamic Assembly in the Portal Model architecture as shown in FIG. 4.

A Dynamic Node becomes visible, when a view uses it to create output, that means when the node is contained in the set of rendered nodes. The number of nodes in this set depends on the view. FIG. 5A shows an example. The view only displays the page groups contained in the one that is currently selected. All other page groups are not visible.

Figure 5B:
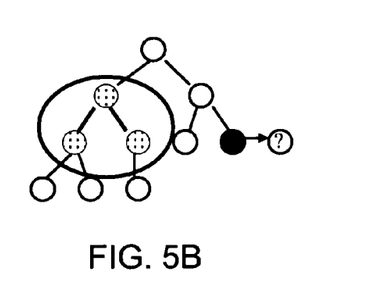
Figure 5C:
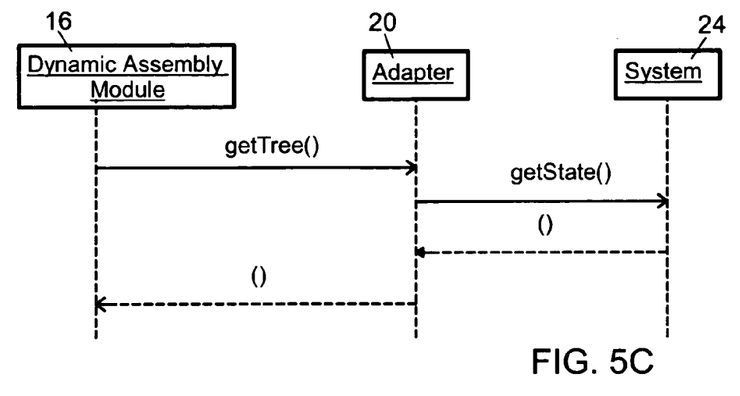
Figure 5D:
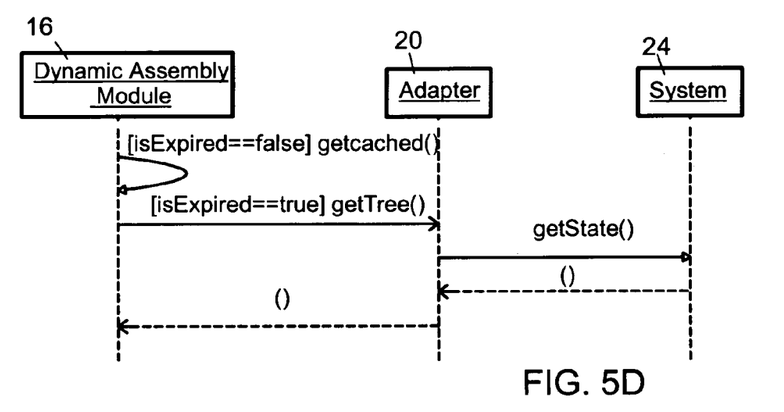
Figure 5E:
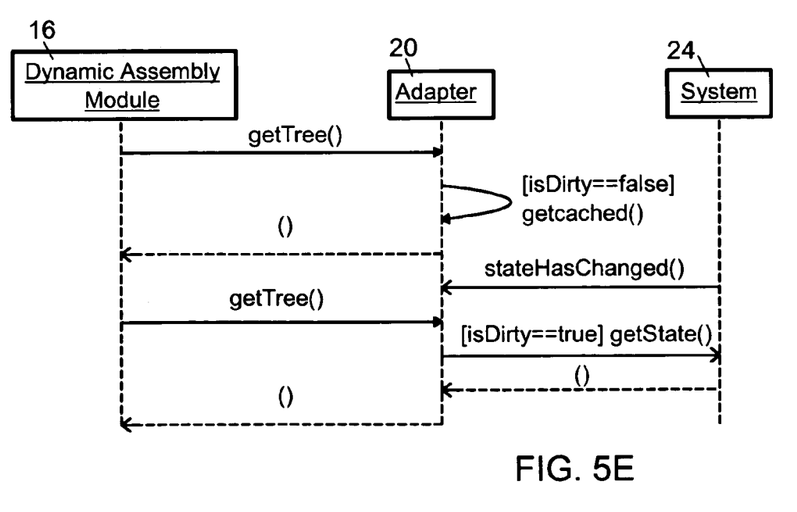
Figure 5F:
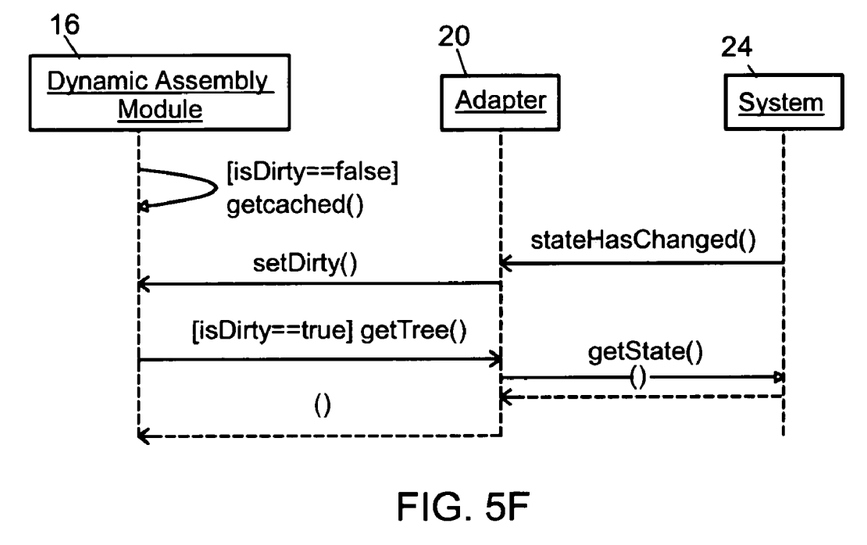

In the first embodiment, resolving takes place before the topology tree is passed to the Graph Transformer. It is possible that Dynamic Nodes are resolved without a need for it because they are not elements of the set of rendered nodes (and all nodes of the appropriate sub trees). This is especially expensive in cases where the actual processing of the trees is time consuming. FIG. 5B shows an example: The user selects the page group that is represented by the left node, so the Dynamic Node is not covered and therefore resolving the fragment placeholder would be unnecessary.

The second embodiment prevents unnecessary resolving at the cost of a more complex design and implementation. Here the Dynamic Nodes are still in the processed presentation tree. When the user navigates through the Portal, the view changes the set of rendered nodes accordingly. In cases where the set includes a Dynamic Node, the appropriate fragment is resolved and the whole tree is used as input for the Graph Transformer again.

As the structure of a topology fragment determines the layout of the presentation of the contained nodes, the Adapter is currently the only component that is responsible for this layout. This contrasts with one of the major goals of Portals: Providing the possibility to customize the Portal presentation to personal interests and preferences. Therefore, there is a need for a mechanism that allows the user to influence the decision of the Adapter.

Although the graph transformer may alter the topology fragment in some way, changes are kept to a minimum because the goal of graph transformation is to make a topology tree Portal conform and not to create a better layout. The big advantage of this approach is that the output of all kind of Adapters can be integrated into the Portal. For example, an Adapter could be written for Portal A. This means that it is aware of the layout capabilities, which could be different from those of Portal B. Although it is intended for Portal A, this Adapter can also be used in Portal B.

The new idea is to pass layout suggestions to the Adapter. As the concrete number of Portals isn't determined in advance, this suggestion can only be described in general, e.g. that a page should not contain more than 4 Portals etc. But who should be allowed to define these suggestions? Each user has his own preferences and imagination of the layout of his pages and therefore the topology fragment should be adapted to these wishes. On the other hand, there will be cases where it makes sense that the Portal itself defines the suggestions, or at least a part of them. There are the options that the user defines the suggestions, both the user and the Portal can define suggestions, or the Portal is the only entity that influences the appearance.

As dynamic assembly is intended to allow for dynamic manipulation of topology trees, the returned fragments will typically vary from call to call to the Adapter. However, it is also possible that a particular fragment remains unchanged for a period of time because the state the Adapter uses to create it doesn't change. In those cases it is a waste of time to compute the fragment from scratch. In order to avoid this, caching concepts can be applied.

The first embodiment uses a Pull Model to update fragments. Every time the Dynamic Assembly Module 16 resolves a fragment placeholder, it calls the Adapter 20 in order to obtain the appropriate topology fragment. Such a call results in at least one more call from the Adapter 20 to the appropriate system and leads to latencies (see FIG. 5C). In cases where the Adapter exactly knows that a particular fragment will not change for a given time, he can inform the Dynamic Assembly Module 16 of this fact. This can be done using an expiry value that is passed to the Dynamic Assembly Module 16 together with the fragment. When the Dynamic Assembly Module 16 receives a request to resolve a fragment placeholder, it first checks whether the appropriate fragment is already expired or not and either returns the fragment immediately or invokes the Adapter. This can lead to a significant reduction of calls to the Adapter 20 (see FIG. 5D).

Another embodiment is to cache fragments inside the Adapter 20, which this time is able to receive notifications from the External System 24. As long as the Adapter receives no notification, it returns the cached fragment. If it receives a notification indicating the change of the fragment, the Adapter sets a dirty flag for the particular fragment. Now a new request to the Adapter leads to a call to the External System 24 (see FIG. 5E). If the rate of changes is low, this will lead to a significant reduction of calls to the backend system. If it is very high, this approach can perform worse than the pull method because in addition to the calls from the Adapter 20 to the systems 24 there are also the notification calls.

The next embodiment modifies the above mechanism. This time the Dynamic Assembly Module 16 caches the fragments. The appropriate dirty flag is set to false until the Adapter 20 receives an appropriate notification and sets it to true (see FIG. 5F). This will decrease the number of calls to the Adapter 20 even more.

Figure 5G:
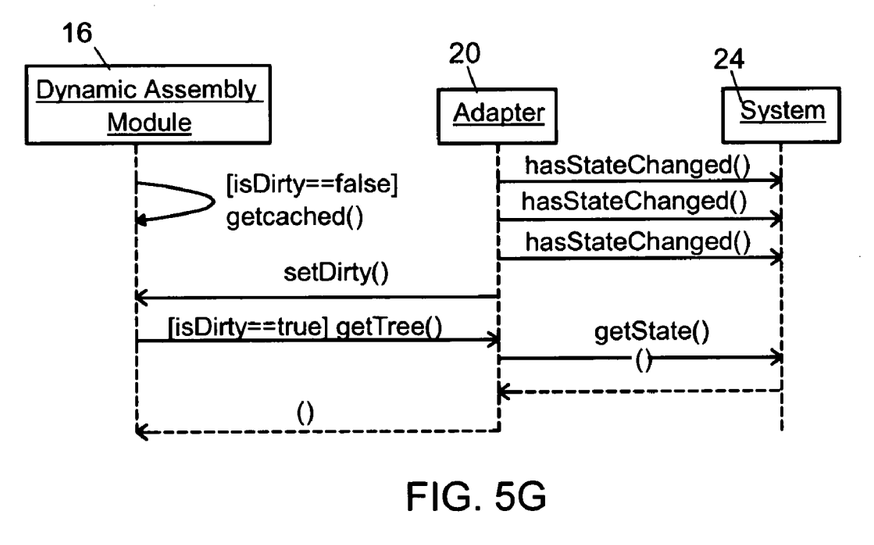

Another embodiment that eliminates the need of receiving notifications but still allows the caching mechanism is to allow the Adapter to call the backend system 20 after a given time interval (see FIG. 5G). The correct setting of this interval is crucial for the success of this concept. Mechanisms to determine this interval could be using logs and other resources to determine the rate of changes statistically and set it statically, or using a program that determines the interval in a timely fashion and sets the value automatically.

The disadvantage of this embodiment is the possibility of inconsistent states between the fragments and the system status they depend on. In cases where such an inconsistency only results in a recoverable error state, the advantage maybe outweighs this disadvantage. In case of error, the Adapter 20 would be forced to call the system immediately and to create a consistent fragment again.

Figure 6:
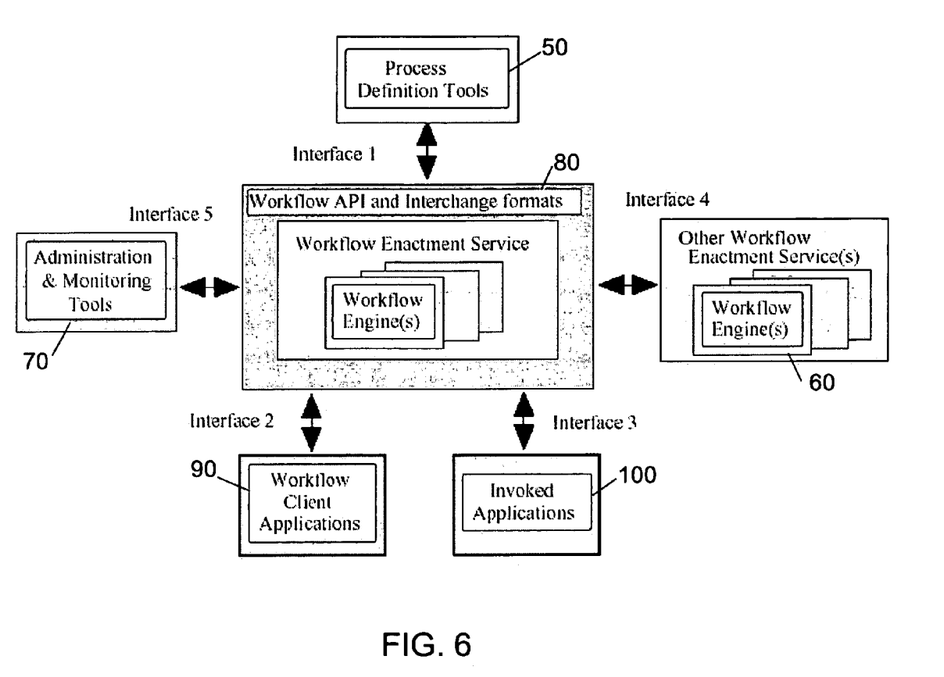
FIG. 6 shows a prior art Work Flow system.
Figure 8:
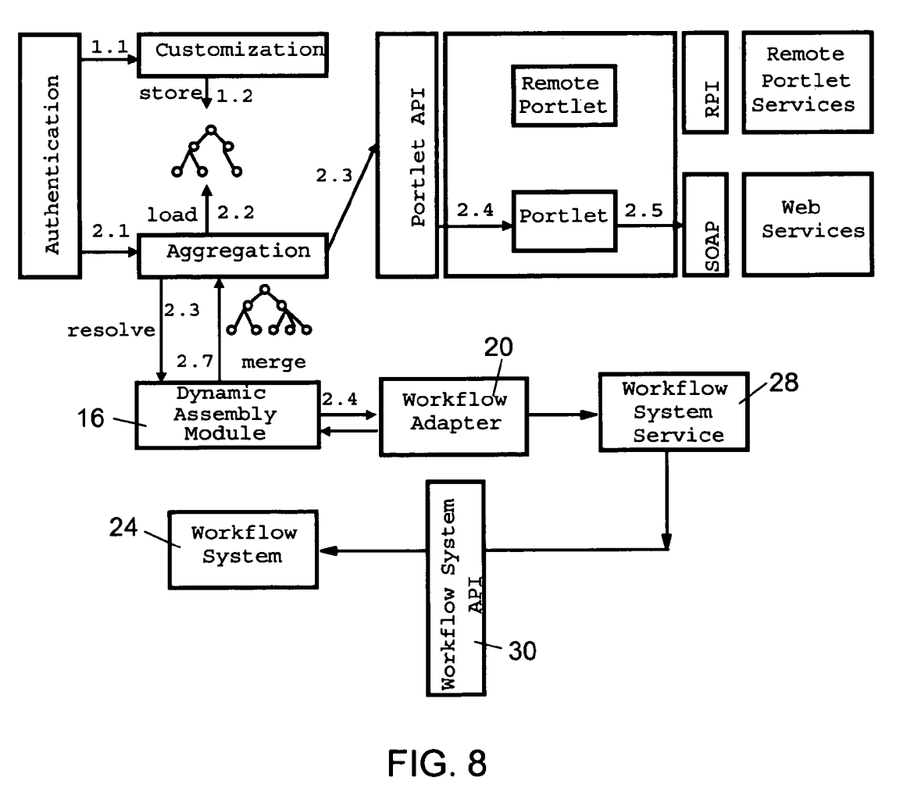
FIG. 8 shows a preferred architecture of the integration of workflow into a Portal system by using the inventive Dynamic Assembly concept.
Figure 9:
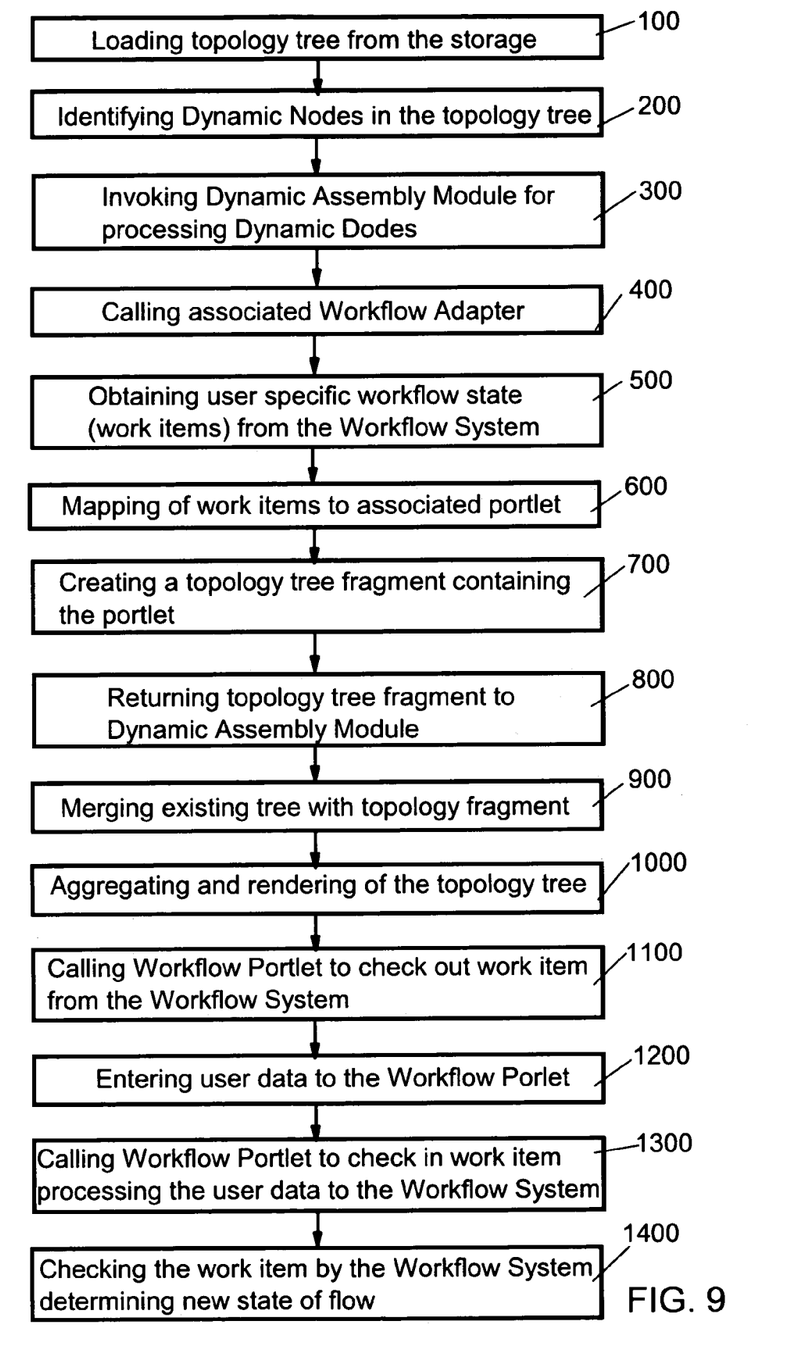
FIG. 9 shows the processing steps of the architecture shown in FIG. 8.

FIG. 6 shows the architecture of a prior art Work Flow system which may be integrated with the Portal using the inventive Dynamic Portal Assembly (see FIG. 8/9).

Workflow in this patent application may be defined as the automation of a business process, in whole or in part, during which documents, information or tasks are passed from one participant to another for action, according to a set of procedural rules.

The execution of Workflow is performed by Workflow Systems that is defined as a system that defines, creates and manages the execution of workflows through the used of software, running on one or more workflow engines, which is able to interpret the process definition, interact with workflow participants and, where required, invoke the use of IT Tools and applications (see FIG. 6).

A Workflow System can be distinguished by a Process Definition Tool, an Administration & Monitoring Tool, Workflow Client Applications, Invoked Applications, other Workflow Services, and a Workflow engine.

The Process Definition Tools 50 is a set of tools that allow the user to define process definitions. These tools are typically visual applications representing process definitions as directed graphs. When work on a process definition is finished, the final definition is exported from the tool (buildtime) and imported into the Workflow System (runtime) where it is executed. The Administration & Monitoring tools allows an administrator to manage the Workflow System. Examples are process monitors or workload monitors, which allow the control of the state of the system and the momentary throughput, respectively. Workflow Client Applications 90 allow users to perform the operations they are authorized for. Examples are the creation, start, or termination of process instances or the start of work items.

Invoked Applications 100 implement the functionality of single activities. Other Workflow Services 60 provide access to the processes running on them, which can be invoked by processes running on the local Workflow System. The Workflow engine 80 having interfaces to other component belonging to the Workflow System.

Figure 7:
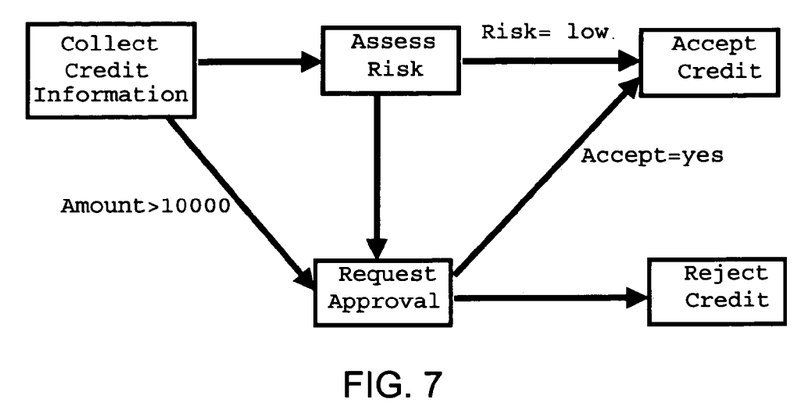
FIG. 7 shows an example of a workflow process.

FIG. 7 shows a graphical representation of an example workflow process. Activities are connected via control connectors to which transition conditions can be assigned that are processed at runtime. Depending on the result, a connector is either followed or not. The connectors therefore define the flow of control through the workflow.

Executing a Workflow (Runtime)

Runtime deals with all aspects of the execution of workflows on a Workflow System. A runtime system uses the following components to mange workflows and their execution.

Process Instance—The representation of a single enactment of a process.

Activity Instance—The representation of an activity within a (single) enactment of a process, i.e. within a process instance.

The process instance is created form the process definition and execution begins with the start activity. Using the provided information, the Workflow System determines which users are capable to process the activity and which applications should be used. In the workflow context a user is also known as a workflow participant, which is defined as a resource which performs the work represented by a workflow activity instance. This work is normally manifested as one or more work items assigned to the workflow participant via the worklist.

In order to inform the workflow participant of the arrival of new work, the system uses the following components. Each user has a work list assigned that is defined as:

Work list—A list of work items associated with a given workflow participant (or in some cases with a group of workflow participants who may share a common work list). The work list forms part of the interface between a workflow engine and the work list handler.

The work items are defined as the representation of the work to be processed (by a workflow participant) in the context of an activity within a process instance.

In cases where more than one user is capable to perform the work described by the activity, the Workflow System creates work items for each one and assigns them to the appropriate work lists of the users. However, the Workflow System has to guarantee that the actual processing of the work is only performed once and only by one user.

Workflow Systems also provide the possibility to check out and check in work items. This means that the Workflow System has not the responsibility to invoke programs associated with activities. It is up to the entity, which checked out work items how they are processed. The Workflow System only expects some result data that is used after check in to determine the state of the flow.

FIG. 8 shows a preferred architecture of an integration of workflow into a Portal system by using the inventive Dynamic Assembly concept.

The architecture comprises the Portal extended by the inventive Dynamic Assembly Module 16 as described in FIG. 5, the Workflow Adapter 20, the Workflow Portlet (not shown), the Workflow System Service 28 (WFMS service), Workflow System API (30), and a Workflow System 24.

The Workflow Adapter 20 is one Adapter implementation that builds a topology tree based on the state of a Workflow System using some kind of layout policy. The Workflow Adapter 20 preferably uses the following method to create topology fragments. For each work list of a user a page is created and its name is set to the one of the work list. For the work items in a list either a 1:1 or a n:1 mapping of work items to Portlet instances is used. As this functionality is contained in the WFMS Service 28, the Workflow Adapter 20 obtains a list of MappingInformation objects from the service. These objects contain all relevant information about a Portlet like the name, the application id, and an additional id. This id is set to the unique id number of the associated work item in case of 1:1 mapping or to the id of a list that contains work items otherwise. The Workflow Adapter 20 creates for each MappingInformation object a Portlet node in the topology fragment.

The WFMS Service 28 is used to encapsulate the WFMS System 24. As long as they implement the defined service interface, the WFMS Service 28 implementations can be exchanged without changing the used Workflow Adapter 20. However, Workflow Systems 24 must meet several requirements, e.g. they must have a transactional mechanism that allows to check out work items, to process them and to check them in again. The WFMS Service 28 is also accessed by Workflow Portlets in order to obtain workflow data.

The Workflow System Application Programming Interface 30 needs to provide the functionality to obtain the work items of a user, to check out the work item. This s means that the responsibility to process the work item is passed from the Workflow System to an external component. The checked out work item is locked (no other user can process it) until it is checked in again. A call to the check out method returns the input data of a work item. Furthermore, the Workflow System Application Programming Interface 30 needs at least the functionality to check in work items. The method gets data as a parameter that is used as the output data of the work item. At the end of check in, the work item is unlocked.

When the Workflow Adapter 20 creates a Portlet node, it adds this id as a parameter to the node. The Dynamic Assembly Module 16 then adds the id to the Portlet data associated with the newly created Portal instance. At runtime, the Workflow Portlet obtains the id from the Portal data and obtains the data of the work item(s) it is assigned to from the WFMS service 28.

In order to achieve independence, the WFMS service 28 does not return WFMS specific work item objects but independent objects of type DataObject. DataObjects contain a unique id, and an object reference. The id is used to link the DataObject to a work item, the reference points to an application specific object. The task of the WFMS service 28 is to map the container of a work item to a DataObject. This is may be done by the following steps:

the WFMS service uses the id that is passed from the Workflow Portlet to access the work item(s), the workflow container is obtained and its type is determined, the type of the container is used to obtain the name of an appropriate ContainerMapper class, this ContainerMapper class can map the content of a Workflow System specific data container to an application specific object and vice versa, and the object is wrapped into a DataObject object and returned to the Portlet.

The Workflow Portlet provides the functionality to perform the task associated with the work item this Portlet is assigned to. Therefore, it can display the input data of the work item to the user and provide the possibility to the user to enter some data.

FIG. 9 shows the overall workflow process within the components of the architecture of FIG. 8.

Flow Process in the Portal

The Portal aggregation loads the topology tree from the storage 100. It traverses it and if a Dynamic Node is located 200 the Dynamic Assembly Module is invoked 300, passing the node. The Dynamic Assembly Module resolves the Adapter that should be used to create the topology tree that is merged with the sub tree of the given node. The Adapter is called 400 and several parameters are passed, e.g. user information 400.

Flow Process in the Workflow Adapter

The Adapter uses the user information to obtain the work items of an user from the Workflow System 500. Each work item is mapped to a workflow Portlet 600 that provides the means to perform the tasks associated with the item. Based on some policy, the Adapter creates a topology tree 700, that contains the above Portlet. The Adapter returns the newly created tree to the Dynamic Assembly Module 800.

Flow Process in the Portal

The Dynamic Assembly Module merges the tree with the sub tree of the Dynamic Node the tree was created for 900. The aggregation component starts to render the tree. It starts at the root and renders all components 1000.

Flow Process in the Workflow Portals

The Workflow Portlet is called to render output 1100. Before starting, the Workflow Portlet calls the Workflow System to check out the work item and uses the returned data to generate output 1100. Then the user interacts with the Workflow Portlet by entering of data 1200. If all work is done by the user, the Workflow Portlet checks in the work item passing the data processed 1300 and a result value that indicates whether processing was successful or not.

Flow Process in the Workflow System

After a work item is checked in, the Workflow System determines the new state of the flow, by evaluating the returned data 1400. Based on this data, the decision is made, which activity is processed next.

The invention claimed is:

1. A computer implemented method for dynamically assembling a topology tree of a portal page, comprising:

loading an existing topology tree of a portal page from storage, wherein the existing topology tree comprises a plurality of nodes;

marking a node of the plurality of nodes of the existing topology tree a dynamic node, wherein said dynamic node comprises a node of said plurality of nodes that references a fragment placeholder, and wherein said fragment placeholder comprises a node that is to be resolved at runtime;

assigning, by a dynamic assembly module, an adapter to said dynamic node;

creating, using said adapter, a topology tree fragment, wherein said topology tree fragment comprises a partial topology tree that is built at runtime; and replacing, by said dynamic assembly module, said fragment placeholder with said topology tree fragment at runtime; assigning an expiry time to topology fragment, wherein the topology fragment does not change for a given period of time, wherein replacing, by said dynamic assembly module, said fragment placeholder with said topology fragment at runtime, comprises:

replacing, by said dynamic Assembly Module fragment, said fragment placeholder at runtime if said expiry time is not expired.

2. The computer implemented method according to claim 1, further comprising the step of:

caching said topology fragment, wherein replacing said fragment placeholder at runtime comprises:

replacing, by said dynamic assembly module, said fragment placeholder by said cached topology fragment at runtime if said adapter does not receive a notification that said topology fragment has been changed.

3. The computer implemented method according to claim 1, wherein said adapter is a workflow adapter, and further comprising the steps of:

obtaining a workflow item from a workflow system;

mapping said workflow item to an associated workflow portlet;

creating a topology fragment containing said workflow portlet; and returning said topology fragment to said dynamic assembly module.

4. The computer implemented method according to claim 3, wherein said workflow portlet performs tasks associated with said workflow item.

5. The computer implemented method according to claim 4, wherein said workflow portlet calls the workflow system to check out the workflow item and to check in the workflow item.

6. The computer implemented method according to claim 5, wherein said workflow portlet receives said workflow item from a workflow system service.

7. The computer implemented method according to claim 6, wherein said workflow system service communicates with said workflow system via a workflow system API which obtains the work items of a user, checks out said workflow item, and checks in said workflow item.

* * * * *